(12) United States Patent
Moran et al.

(10) Patent No.: US 12,131,027 B1
(45) Date of Patent: Oct. 29, 2024

(54) SWITCHING OF REPLICATION RELATIONSHIP BETWEEN STORAGE SYSTEMS

(71) Applicant: INTERNATIONAL BUSINESS MACHINES CORPORATION, Armonk, NY (US)

(72) Inventors: Timothy Andrew Moran, Southampton (GB); Dominic Tomkins, Alton (GB); Nicholas Michael O'Rourke, Southampton (GB); Warren Hawkins, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 29 days.

(21) Appl. No.: 18/318,510

(22) Filed: May 16, 2023

(51) Int. Cl.
G06F 12/00 (2006.01)
G06F 3/06 (2006.01)

(52) U.S. Cl.
CPC .............. G06F 3/061 (2013.01); G06F 3/065 (2013.01); G06F 3/0653 (2013.01); G06F 3/067 (2013.01)

(58) Field of Classification Search
CPC ........ G06F 3/061; G06F 3/065; G06F 3/0653; G06F 3/067; G06F 3/0614; G06F 3/0646
See application file for complete search history.

(56) References Cited

U.S. PATENT DOCUMENTS

| 10,606,497 B1 * | 3/2020 | Patel ..................... G06F 3/0617 |
| 2007/0245081 A1 | 10/2007 | Ogawa |
| 2019/0042636 A1 | 2/2019 | Sipka et al. |
| 2021/0303164 A1 | 9/2021 | Grunwald et al. |

FOREIGN PATENT DOCUMENTS

WO 2022268503 A1 12/2022

* cited by examiner

*Primary Examiner* — Shawn X Gu
(74) *Attorney, Agent, or Firm* — KONRAD, RAYNES, DAVDA & VICTOR LLP; Rabindranath Dutta (57) ABSTRACT

Provided are a method, system, and computer program product in which a storage volume is configured to be maintained in a replicated relationship between two storage systems. A reversing is performed of a switch of a direction of replication for a replicated storage volume, in response to determining that host activity does not sufficiently match a pre-switch host activity, where the host activity does not sufficiently match the pre-switch host activity if a predetermined set of criteria is not met.

20 Claims, 8 Drawing Sheets

SWITCHING OF REPLICATION RELATIONSHIP BETWEEN STORAGE SYSTEMS

BACKGROUND

Embodiments relate to a method, system, and computer program product for the switching of replication relationship between storage systems.

Continuous availability of data is becoming increasingly feasible due to advances in infrastructure components such as networking devices, computing devices, and storage devices. It is also a necessity for many types of businesses.

Dual-site solutions may provide continuous availability of data during planned and unplanned outages of computing systems. If storage at either site goes offline, such solutions may automatically fail over storage access to the system at the surviving site. In order to implement such solutions, a storage volume may be replicated from one storage system to another storage system, and hosts may perform Input/Output (I/O) operations with respect to storage volumes in either of the storage systems.

SUMMARY

Provided are a method, system, and computer program product in which a storage volume is configured to be maintained in a replicated relationship between two storage systems. A reversing is performed of a switch of a direction of replication for a replicated storage volume, in response to determining that host activity does not sufficiently match a pre-switch host activity, where the host activity does not sufficiently match the pre-switch host activity if a predetermined set of criteria is not met.

In additional embodiments, the storage volume is a replication enabled storage volume, where the two storage systems comprise a first storage system and a second storage system, where the first storage system includes a first host and a first storage volume that is a primary copy of the replication enabled storage volume, and where the second storage system comprises a second host and a second storage volume that is a secondary copy of the replication enabled storage volume.

In further embodiments, host activity information is measured for one or more hosts mapped to the first storage volume, prior to switching the direction of replication. In response to switching the direction of replication, operations are performed for measuring the host activity information for the one or more hosts with respect to the second storage volume, and in response to determining that the host activity information for the one or more hosts with respect to the second storage volume failed to meet the predetermined set of criteria, the direction of replication is switched back.

In further embodiments, the host activity information comprises a determination of host behavior, and the host activity information is associated with a corresponding host-volume pair in the second storage system.

In additional embodiments, the determination of host behavior includes monitoring of command counts and command latencies.

In yet additional embodiments, the determination of host behavior also includes monitoring of: types of commands received; logical block address ranges that are addressed; and command lengths.

In further embodiments, host behavior for each host mapped to the storage volume is monitored both before and after a switch in the direction of replication to determine whether the direction of replication should be reversed to improve the host behavior.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Volumes may be replicated across two storage systems to protect against the loss of one of those storage systems, or to allow a volume to be migrated from one storage system to another. One of the storage systems may present a primary/active copy of the volume to hosts, while the other may present a secondary/passive/standby copy of the volume. Although both volumes can be accessed by hosts, only the primary copy will service I/O requests. The direction of the replication relationship between the two copies of the volume can be switched to switch which copy is the primary and which copy the secondary.

However, because the host typically does not send I/O to the secondary copy of the volume, hardware or configuration issues which prevent or limit access may not be discovered while that volume is the secondary, but may present themselves when the direction of the replication relationship is switched. In this case, hosts mapped to the secondary copy of the volume may see a degradation in performance (including complete loss of access) at the time of the switch, which may persist indefinitely.

Certain embodiments provide mechanisms to collect, transmit and monitor host activity information between the two storage systems at the time of the switch in direction of the replication relationship, and to automatically switch back the direction of the replication relationship in the case that host activity on the second storage system does not match the host activity previously measured on the first storage system.

In certain embodiments by recording host activity information, by transmitting the host activity information between two storage systems, and by optionally associating the host activity information with the corresponding host-volume pair in the second storage system, unexpected variation in behavior between the two storage systems is detected. An unexpected variation in behavior between the two storage systems may trigger a fail-back to the original storage system. As a result, improvements are made to the performance of storage systems.

Certain embodiments provide mechanisms for monitoring and associating host activity information across different hosts on different storage systems that are mapped to the same storage volume replicated across both storage systems. Such embodiments may be used to detect any host connectivity problems at the time of a switch in the direction of the replication relationship, such that the direction of the relationship can be switched back to ensure that the hosts do not experience degraded levels of access to those storage volumes.

Figure 1A:
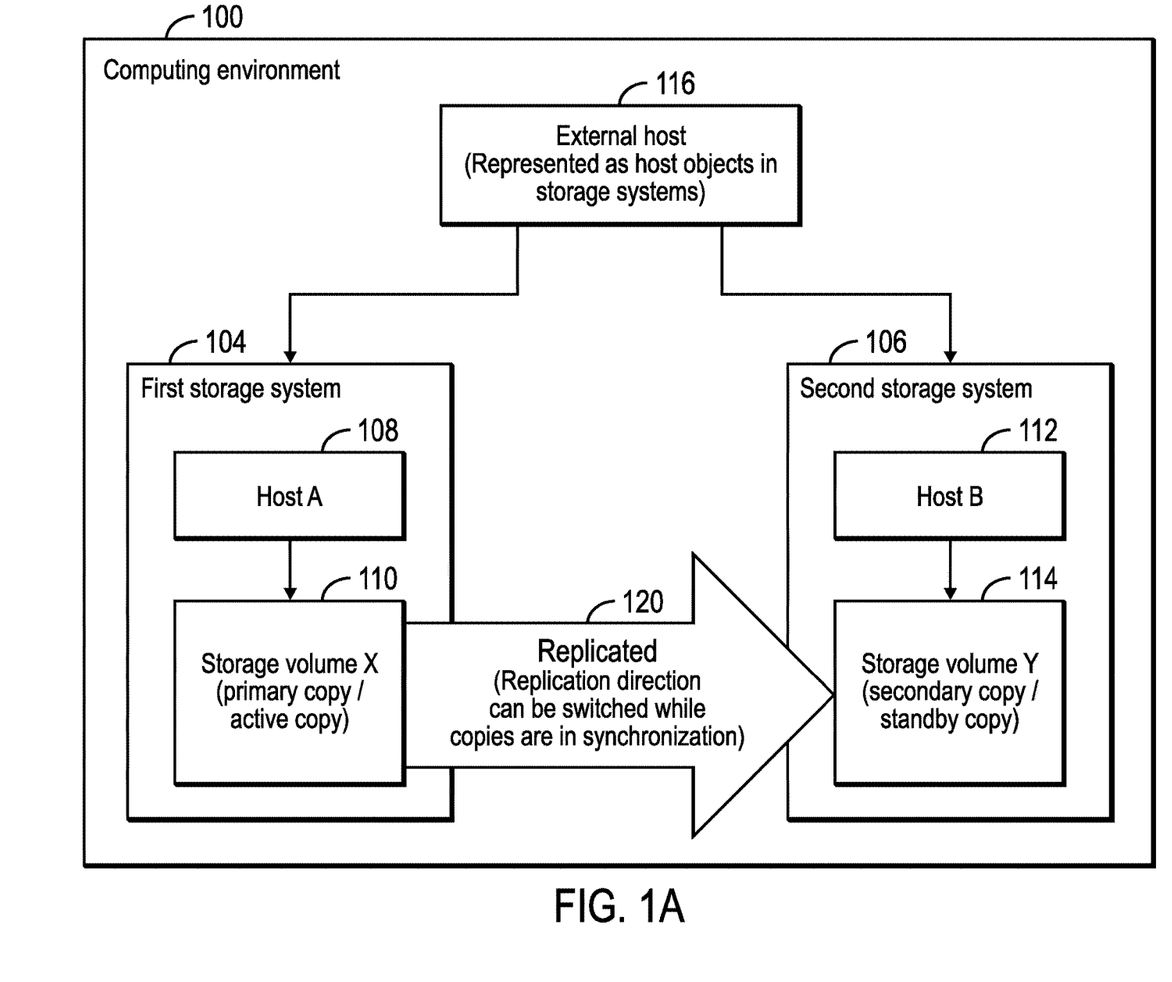
FIG. 1A illustrates a block diagram of a computing environment, in accordance with certain embodiments.

FIG. 1A illustrates a block diagram of a computing environment 100, in accordance with certain embodiments. The computing environment 100 includes a first storage system 104 and a second storage system 106.

The first storage system 104 includes a host A 108 and a storage volume X 110, and the second storage system 106 includes a host B 112 and a storage volume Y 114.

In certain embodiments, the storage systems 104, 106 and the hosts 108, 112 may comprise any suitable computational device including those presently known in the art, such as, a personal computer, a workstation, a mainframe, a hand held computer, a palm top computer, a head mounted computer, a telephony device, a network appliance, a blade computer, a processing device, a controller, etc. The storage volumes 110, 114 may include those presently known in the art and may include logical volumes whose data is stored in physical volumes stored in disk drives, solid state drives, tape drives or other types of storage devices. The elements shown in FIG. 1 may be in any suitable network, such as, a storage area network, a wide area network, the Internet, an intranet, etc., or in a cloud computing environment.

An external host 116 coupled to both the first storage system 104 and the second storage system 106 may be represented as host objects by the hosts 108, 112 in the storage systems 104, 106. For example, applications in the external host 116 may access storage volumes 110, 114, while the external host 116 is being represented as host objects by the hosts 108, 112.

The storage volume X 110 may be replicated (shown via reference numeral 120) to the storage volume Y 114, i.e., the storage volume Y 114 is a copy of the storage volume X 110 and updates to storage volume X 110 are propagated to storage volume Y 114 with the direction of replication being from storage volume X 110 to storage volume Y 114. In FIG. 1A the storage volume X 110 is the primary copy (also referred to as active copy), and the storage volume Y is the secondary copy (also referred to as standby copy). A reversal of the direction of replication than that shown in FIG. 1 is also possible and on reversal of the direction of replication, the storage volume X 110 is a copy of storage volume Y 114 and updates to storage volume Y 114 are propagated to storage volume X 110. The replication direction can be switched while storage volume X 110 and storage volume Y 114 are in synchronization.

On the first storage system 104, host A 108 is mapped to storage volume X 110. Storage volume X 110 is the primary copy (active volume) of a replicated volume that has a secondary copy (passive or standby volume) on storage volume Y 114 on the second storage system 106. On the second storage system 106, storage volume Y 114 is mapped to host B 112.

A switch of the direction of the replication relationship between storage volumes may be anticipated, such as for example, at an early stage of processing a command line interface (CLI) command to switch the replication relationship.

The switch in the replication relationship will reverse the paths states for the volume on each of the two storage systems 104, 106. For example, a volume that presented primary/active paths to hosts on the first storage system 104 before the switch will now present primary/active paths on the second storage system 106 after the switch. This volume presents secondary/passive/standby paths (that do not permit I/O) on the second storage system 106 before the switch, and will present secondary/passive/standby paths on the first storage system 104 after the switch.

Figure 1B:
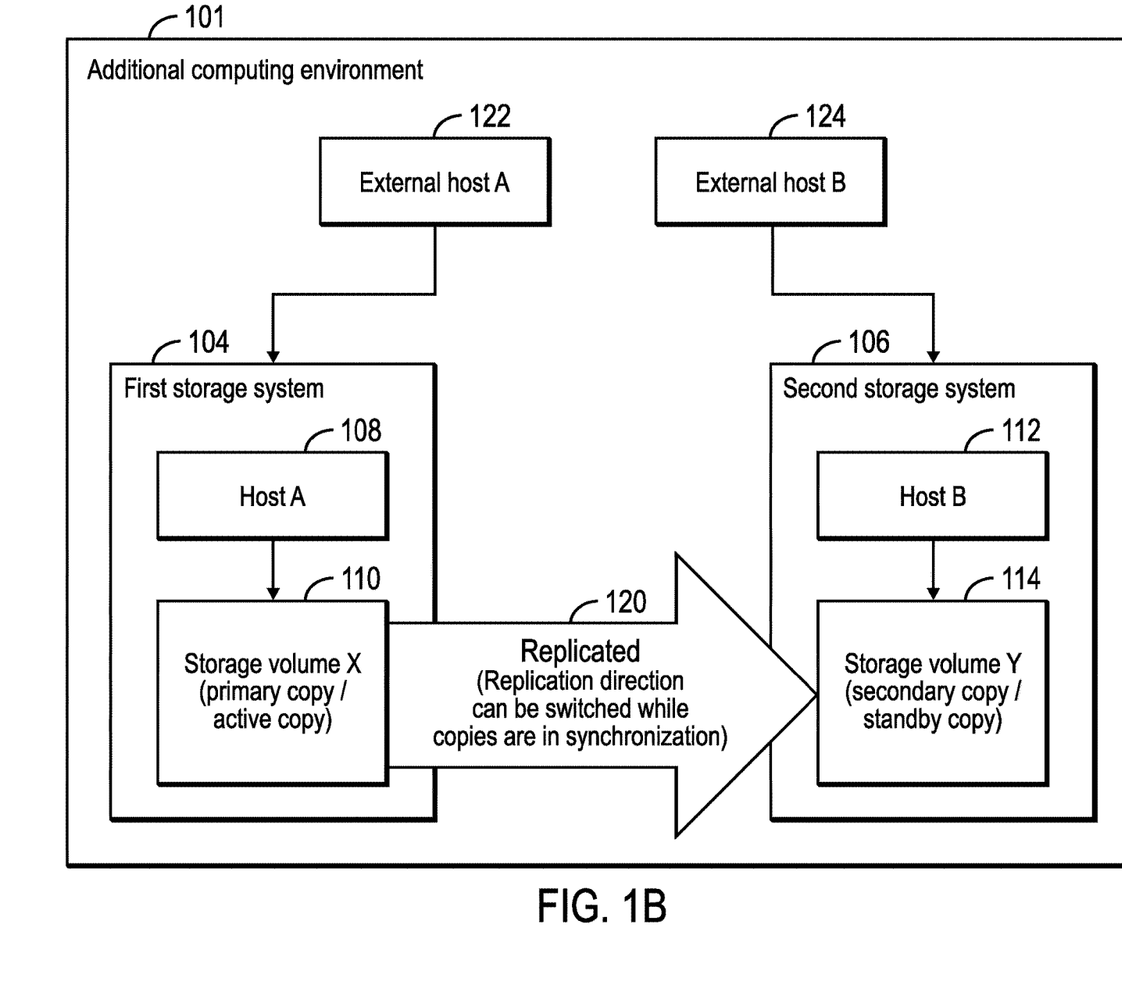
FIG. 1B illustrates a block diagram of an additional computing environment, in accordance with certain embodiments.

FIG. 1B illustrates a block diagram of an additional computing environment 101, in accordance with certain embodiments. The computing environment 101 includes the first storage system 104 and the second storage system 106. However, unlike FIG. 1A where a single external host 116 was coupled to both the first storage system 104 and the second storage system 106, in FIG. 1B there are two external hosts A and B (reference numerals 122, 124). External host A 122 is coupled to the first storage system 104 and external host 124 is coupled to the second storage system 106. Thus unlike FIG. 1A where host objects within a storage system may represent a single external host, in FIG. 1B the host objects within a storage system may have the capability to represent multiple external hosts.

Figure 2:
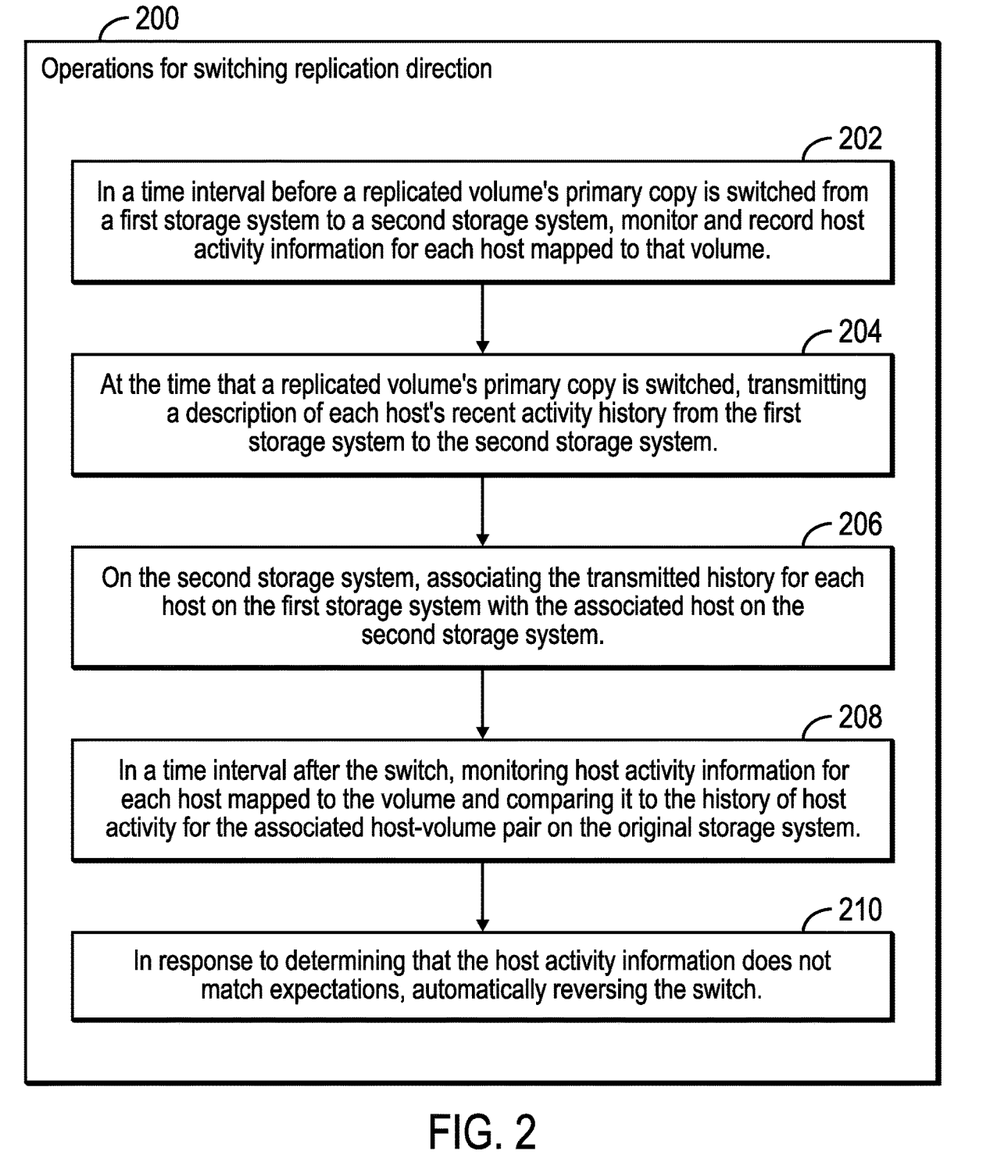
FIG. 2 illustrates a flowchart that shows operations for switching the direction of replication, in accordance with certain embodiments.

FIG. 2 illustrates a flowchart 200 that shows operations for switching the direction of replication, in accordance with certain embodiments. The operations shown the flowchart 200 is performed by a process that executes in the storage system 102.

Control starts at block 202, in which in a time interval before a replicated volume's primary copy is switched from a first storage system 104 to a second storage system 106, the process may monitor and record host activity information for each host mapped to that volume.

Control proceeds to block 204 in which at the time that a replicated volume's primary copy is switched, the process transmits a description of each host's recent activity history from the first storage system 104 to the second storage system 106. On the second storage system 106, the process associates (at block 206) the transmitted history for each host on the first storage system 104 with the associated host on the second storage system 106.

In a time interval after the switch, the process monitors (at block 208) host activity information for each host mapped to the volume and compares it to the history of host activity for the associated host-volume pair on the original storage system. In the case that the host activity information does not match expectations, the process automatically reverses the switch (at block 210).

Figure 3:
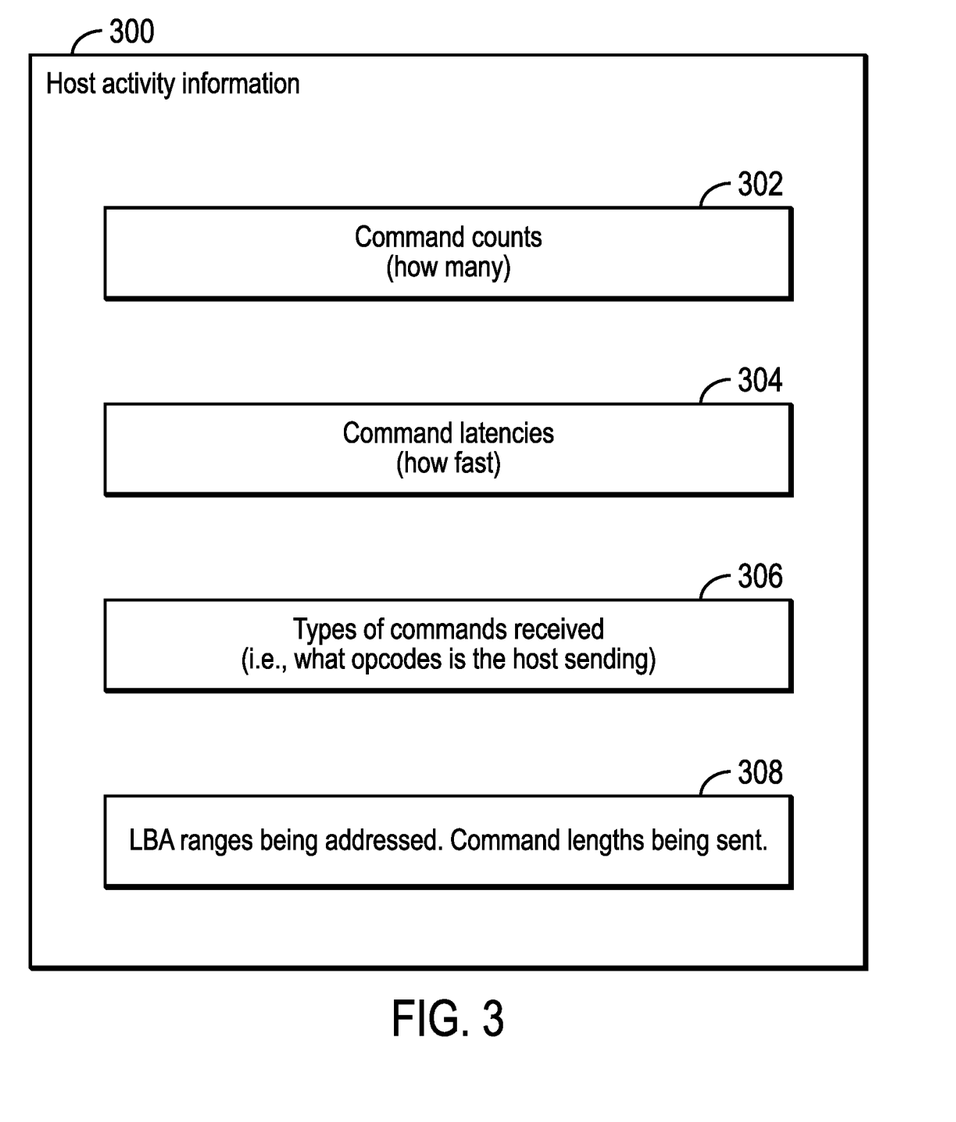
FIG. 3 illustrates a block diagram that shows host activity information, in accordance with certain additional embodiments.

FIG. 3 illustrates a block diagram that shows host activity information 300, in accordance with certain additional embodiments. For each host mapped to the replicated volume, a process monitors and records host activity information for the primary/active paths in a sampling interval before the switch. This host activity information may contain any combination of:

(1) command counts (i.e., how many command);
(2) command latencies (i.e., how fast the commands are executed);
(3) types of commands received (i.e., what opcodes are the host sending); and
(4) Logical block address (LBA) ranges being addressed, and command lengths being sent.

The host activity information may be used to determine whether a predetermined behavior requirement is being satisfied for I/O operations with respect to a storage volume by one or more hosts.

Figure 4:
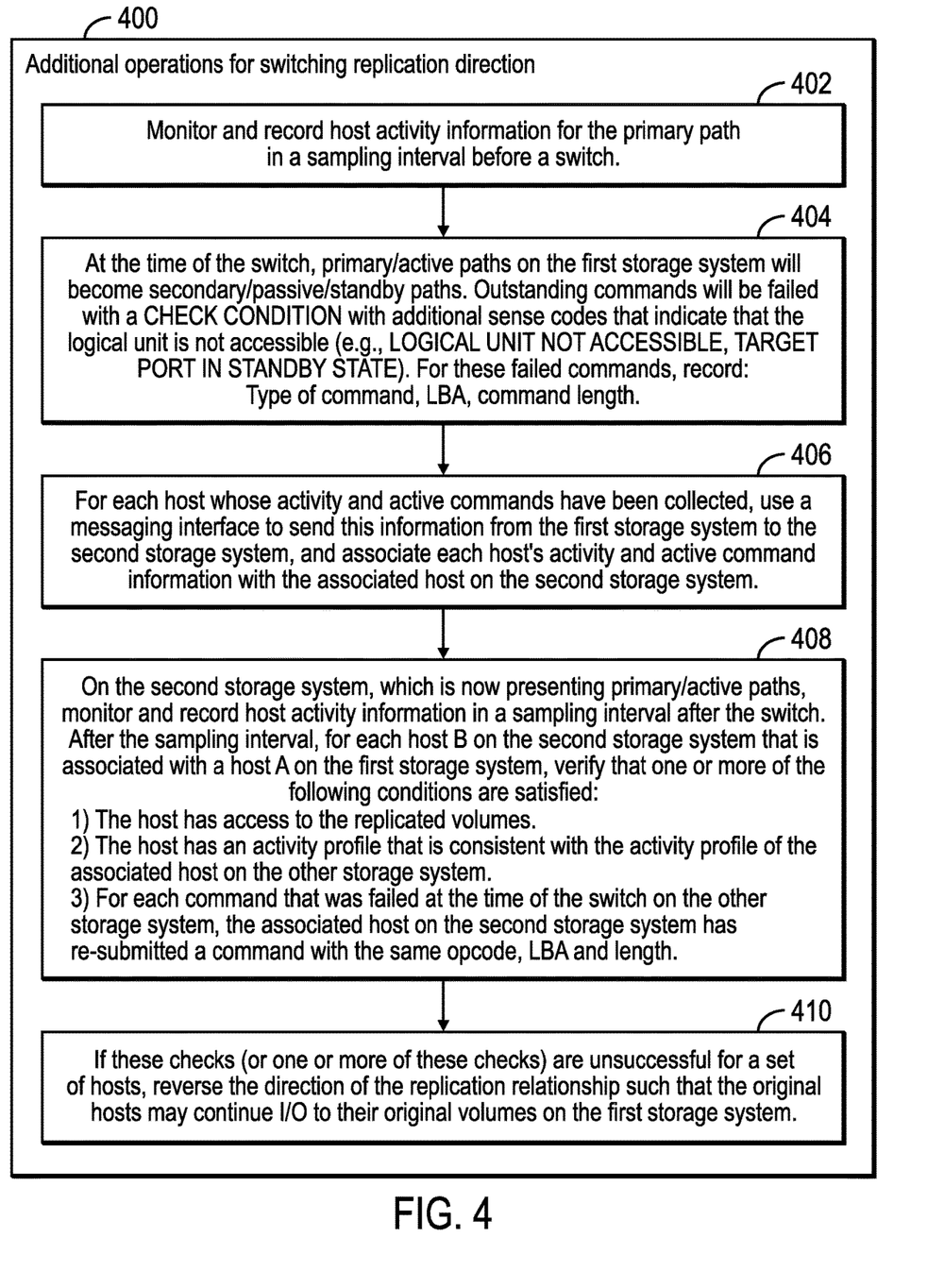
FIG. 4 illustrates a flowchart that shows additional operations for switching the direction of replication, in accordance with certain embodiments.

FIG. 4 illustrates a flowchart 400 that shows additional operations for switching the direction of replication, in accordance with certain embodiments. The operations shown in FIG. 4 may be performed by a process that executes in the computing environment 100.

Control starts at block 402 in which the process monitors and records host activity information for the primary path in a sampling interval before a switch in the replication direction. At the time of the switch (at block 404), primary/active paths on the first storage system 104 will become secondary/passive/standby paths. Outstanding commands will be failed with a CHECK CONDITION with additional sense codes that indicate that the logical unit is not accessible (e.g., LOGICAL UNIT NOT ACCESSIBLE, TARGET PORT IN STANDBY STATE codes). For these failed commands, a record is made of the type of command, the LBA, and the command length.

For each host whose activity and active commands have been collected, the process uses (at block 406) a messaging interface to send this information from the first storage system 104 to the second storage system 106, and associates each host's activity and active command information with the associated host on the second storage system 106.

On the second storage system 106, which is now presenting primary/active paths, the process monitors and records (at block 408) host activity information in a sampling interval after the switch. After the sampling interval, for each host B 112 on the second storage system 106 that is associated with a host A 108 on the first storage system 104, the process verifies that one or more of the following three conditions are satisfied:

(1) The host has access to the replicated volumes (e.g., it has logged in and performed volume discovery, either at the time of or prior to the switch).
(2) The host has an activity profile that is consistent with the activity profile of the associated host on the other storage system (e.g., similar LBA ranges are being addressed; similar opcodes are being sent; similar latencies are being reported).
(3) For each command that was failed at the time of the switch on the other storage system, the associated host on the second storage system has re-submitted a command with the same opcode, LBA and length (e.g., commands have been resubmitted down the active paths).

The satisfaction of any subset of the above three conditions may be sufficient. For example, some hosts may not re-drive commands, in which case (3) is of much lower importance than (1) and (2). If these checks (or one or more of these checks) are unsuccessful for a set of hosts, the process reverses (at block 410) the direction of the replication relationship such that the original hosts may continue I/O to their original volumes on the first storage system 104.

Figure 5:
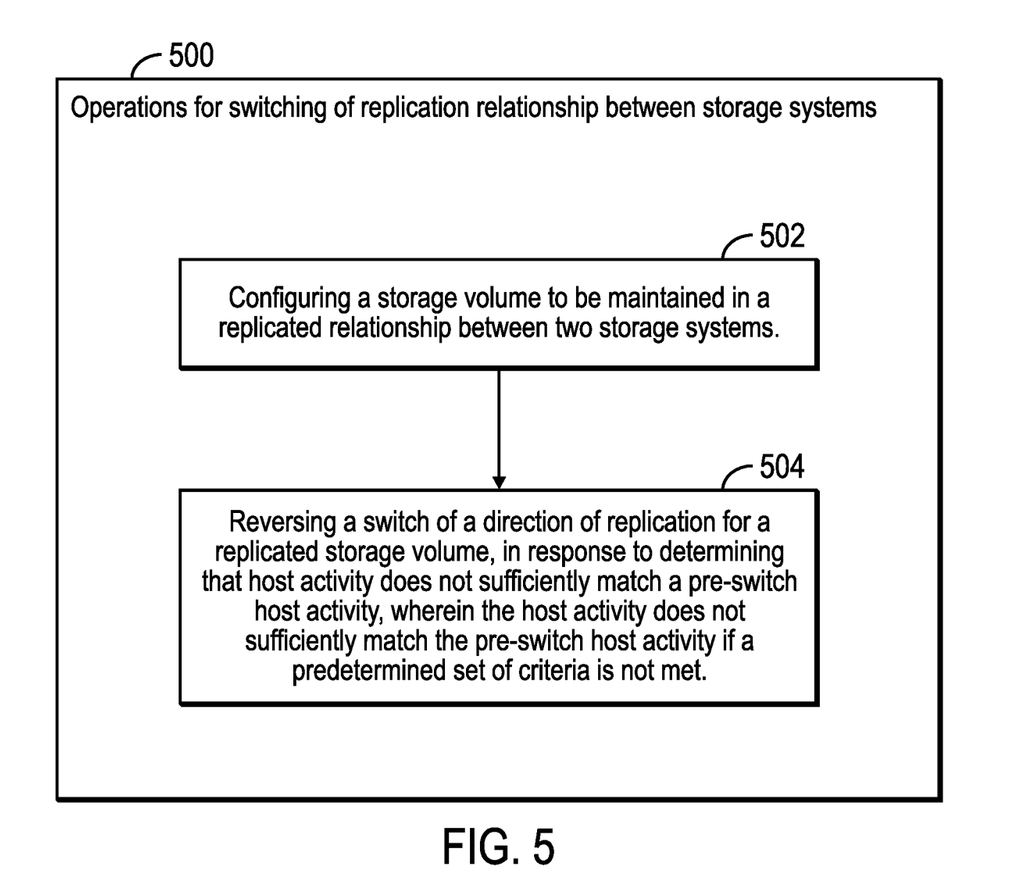
FIG. 5 illustrates a flowchart that shows operations for switching of replication relationship between storage systems, in accordance with certain embodiments.

FIG. 5 illustrates a flowchart 500 that shows operations for switching of replication relationship between storage systems, in accordance with certain embodiments. The operations shown in FIG. 5 may be performed by a process that executes in the computing environment 100.

Control starts at block 502, in which a storage volume is configured to be maintained in a replicated relationship between two storage systems 104, 106.

From block 502 control proceeds to block 504 in which a reversing is performed of a switch of a direction of replication for a replicated storage volume, in response to determining that host activity does not sufficiently match a pre-switch host activity, where the host activity does not sufficiently match the pre-switch host activity if a predetermined set of criteria is not met.

Figure 6:
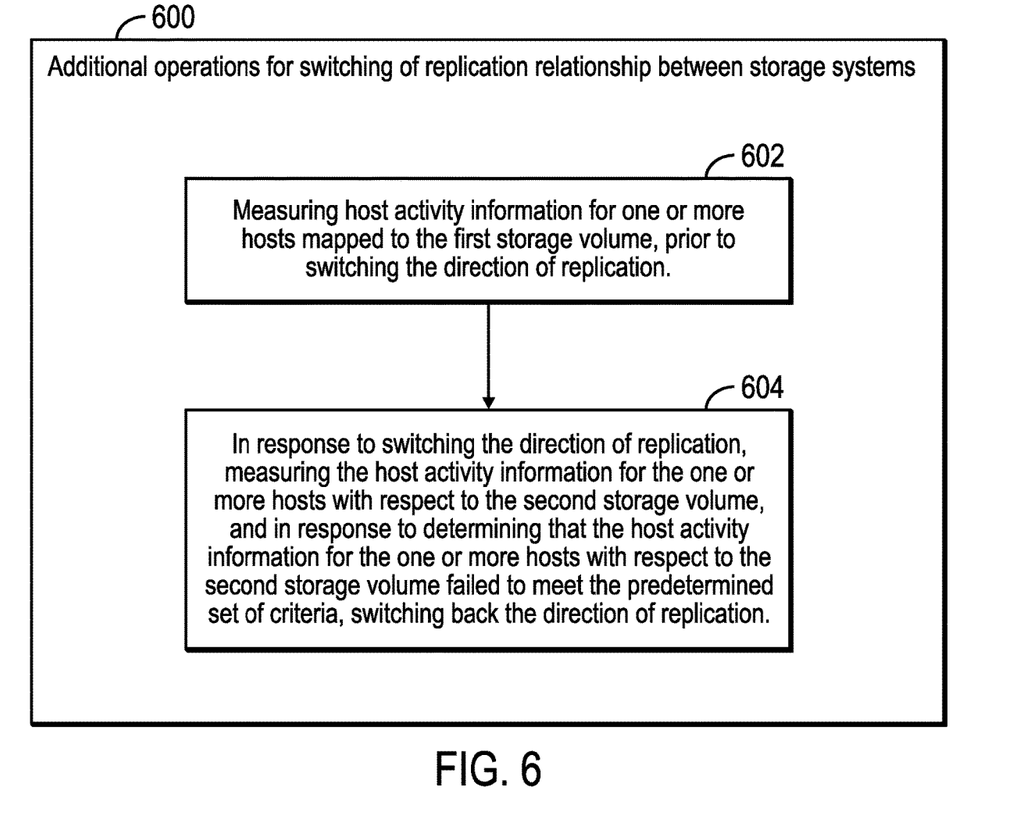
FIG. 6 illustrates a flowchart that shows additional operations for the switching of replication relationship between storage systems, in accordance with certain embodiments.

FIG. 6 illustrates a flowchart 600 that shows additional operations for switching of replication relationship between storage systems, in accordance with certain embodiments. The operations shown in FIG. 6 may be performed by a process that executes in the computing environment 100.

In the embodiments shown in FIG. 6, a storage volume is a replication enabled storage volume, where two storage systems comprise a first storage system 104 and a second storage system 106, where the first storage system includes a first host 108 and a first storage volume 110 that is a primary copy of the replication enabled storage volume, and where the second storage system 106 comprises a second host 112 and a second storage volume 114 that is a secondary copy of the replication enabled storage volume.

Control starts at block 602 in which operations are performed to measure host activity information for one or more hosts mapped to the first storage volume, prior to switching the direction of replication.

From block 602 control proceeds to block 604 in which in response to switching the direction of replication, operations are performed for measuring the host activity information for the one or more hosts with respect to the second storage volume, and in response to determining that the host activity information for the one or more hosts with respect to the second storage volume failed to meet the predetermined set of criteria, the direction of replication is switched back.

Therefore, FIGS. 1A, 1B, 2-6 illustrate embodiments for switching the replication relationship between two storage systems.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 7:
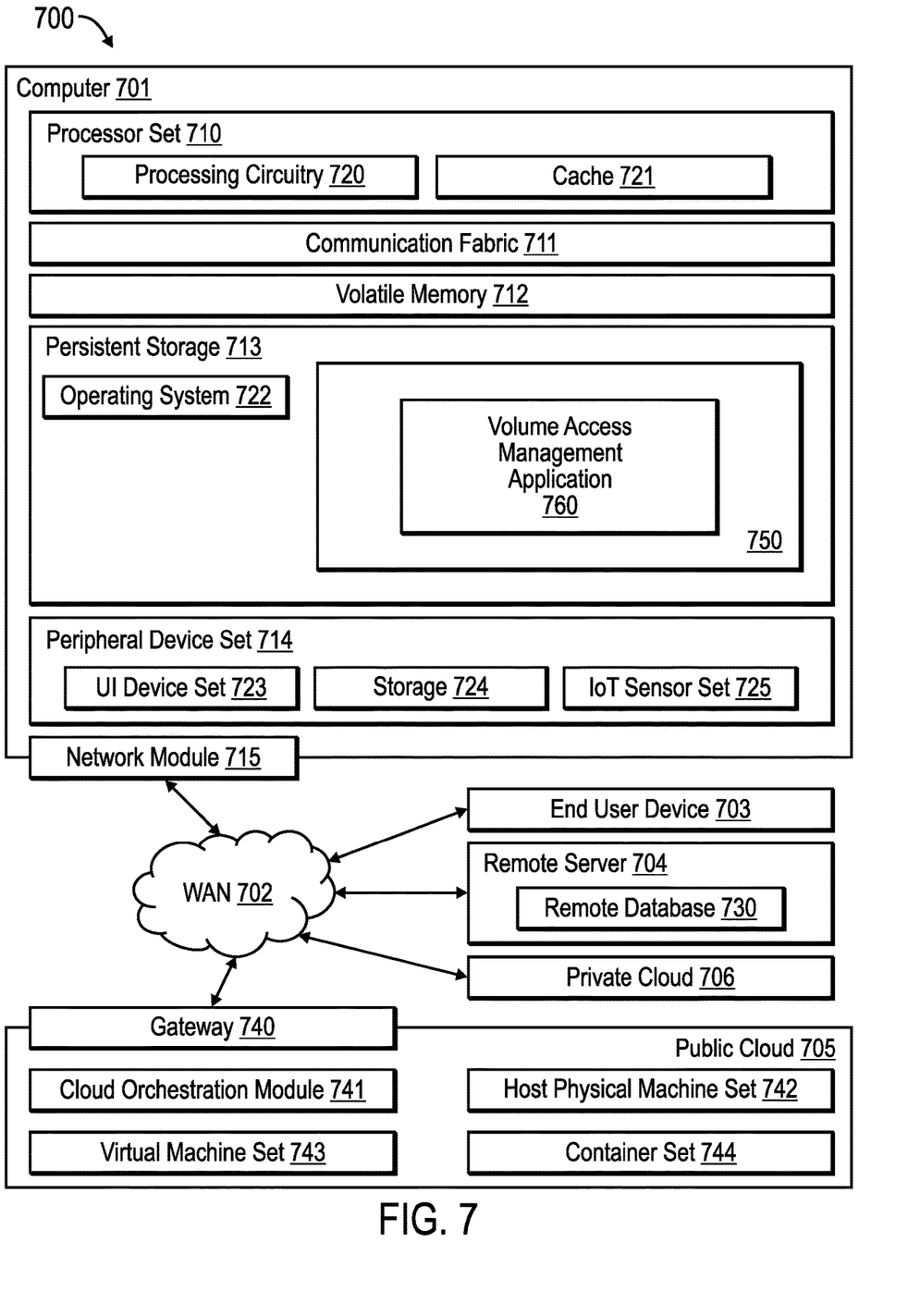
FIG. 7 illustrates a computing environment in which certain components may be implemented, in accordance with certain embodiments.

In FIG. 7, computing environment 700 contains an example of an environment for the execution of at least some of the computer code (block 750) involved in performing the operations of a volume access management application 760 that performs operations shown in FIGS. 1A, 1B, 2-6.

In addition to block 750, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 750, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 750 in persistent storage 713.

COMMUNICATION FABRIC 711 is the signal conduction path that allows the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid-state storage devices. Operating system 722 may take several forms, such as various known proprietary operating systems or open-source Portable Operating System Interface-type operating systems that employ a kernel. The code included in block 750 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. I/O T sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method comprising:
configuring a storage volume to be maintained in a replicated relationship between two storage systems; and
reversing a switch of a direction of replication for a replicated storage volume, in response to determining that host activity does not sufficiently match a pre-switch host activity, wherein the host activity does not sufficiently match the pre-switch host activity if a predetermined set of criteria is not met.

2. The method of claim 1, wherein the storage volume is a replication enabled storage volume, wherein the two storage systems comprise a first storage system and a second storage system, wherein the first storage system includes a first host and a first storage volume that is a primary copy of the replication enabled storage volume, and wherein the second storage system comprises a second host and a second storage volume that is a secondary copy of the replication enabled storage volume.

3. The method of claim 2, the method further comprising:
measuring host activity information for one or more hosts mapped to the first storage volume, prior to switching the direction of replication; and
in response to switching the direction of replication, measuring the host activity information for the one or more hosts with respect to the second storage volume, and in response to determining that the host activity information for the one or more hosts with respect to the second storage volume failed to meet the predetermined set of criteria, switching back the direction of replication.

4. The method of claim 3, wherein the host activity information comprises a determination of host behavior, and wherein the host activity information is associated with a corresponding host-volume pair in the second storage system.

5. The method of claim 4, wherein the determination of host behavior includes monitoring of:
command counts; and
command latencies.

6. The method of claim 5, wherein the determination of host behavior also includes monitoring of:
types of commands received;
logical block address ranges that are addressed; and
command lengths.

7. The method of claim 1, wherein host behavior for each host mapped to the storage volume is monitored both before and after a switch in the direction of replication to determine whether the direction of replication should be reversed to improve the host behavior.

8. A system, comprising:
a memory; and
a processor coupled to the memory, wherein the processor performs operations, the operations comprising: configuring a storage volume to be maintained in a replicated relationship between two storage systems; and
reversing a switch of a direction of replication for a replicated storage volume, in response to determining that host activity does not sufficiently match a pre-switch host activity, wherein the host activity does not sufficiently match the pre-switch host activity if a predetermined set of criteria is not met.

9. The system of claim 8, wherein the storage volume is a replication enabled storage volume, wherein the two storage systems comprise a first storage system and a second storage system, wherein the first storage system includes a first host and a first storage volume that is a primary copy of the replication enabled storage volume, and wherein the second storage system comprises a second host and a second storage volume that is a secondary copy of the replication enabled storage volume.

10. The system of claim 9, the operations further comprising:
   measuring host activity information for one or more hosts mapped to the first storage volume, prior to switching the direction of replication; and
   in response to switching the direction of replication, measuring the host activity information for the one or more hosts with respect to the second storage volume, and in response to determining that the host activity information for the one or more hosts with respect to the second storage volume failed to meet the predetermined set of criteria, switching back the direction of replication.

11. The system of claim 10, wherein the host activity information comprises a determination of host behavior, and wherein the host activity information is associated with a corresponding host-volume pair in the second storage system.

12. The system of claim 11, wherein the determination of host behavior includes monitoring of:
   command counts; and
   command latencies.

13. The system of claim 12, wherein the determination of host behavior also includes monitoring of:
   types of commands received;
   logical block address ranges that are addressed; and
   command lengths.

14. The system of claim 8, wherein host behavior for each host mapped to the storage volume is monitored both before and after a switch in the direction of replication to determine whether the direction of replication should be reversed to improve the host behavior.

15. A computer program product, the computer program product comprising a computer readable storage medium having computer readable program code embodied therewith, the computer readable program code when executed is configured to perform operations, the operations comprising:
   configuring a storage volume to be maintained in a replicated relationship between two storage systems; and
   reversing a switch of a direction of replication for a replicated storage volume, in response to determining that host activity does not sufficiently match a pre-switch host activity, wherein the host activity does not sufficiently match the pre-switch host activity if a predetermined set of criteria is not met.

16. The computer program product of claim 15, wherein the storage volume is a replication enabled storage volume, wherein the two storage systems comprise a first storage system and a second storage system, wherein the first storage system includes a first host and a first storage volume that is a primary copy of the replication enabled storage volume, and wherein the second storage system comprises a second host and a second storage volume that is a secondary copy of the replication enabled storage volume.

17. The computer program product of claim 16, the operations further comprising:
   measuring host activity information for one or more hosts mapped to the first storage volume, prior to switching the direction of replication; and
   in response to switching the direction of replication, measuring the host activity information for the one or more hosts with respect to the second storage volume, and in response to determining that the host activity information for the one or more hosts with respect to the second storage volume failed to meet the predetermined set of criteria, switching back the direction of replication.

18. The computer program product of claim 17, wherein the host activity information comprises a determination of host behavior, and wherein the host activity information is associated with a corresponding host-volume pair in the second storage system.

19. The computer program product of claim 18, wherein the determination of host behavior includes monitoring of:
   command counts; and
   command latencies.

20. The computer program product of claim 19, wherein the determination of host behavior also includes monitoring of:
   types of commands received;
   logical block address ranges that are addressed; and
   command lengths.

* * * * *